Sept. 13, 1966  H. J. GOODWIN  3,273,036
REMOTE CONTROL APPARATUS
Filed April 23, 1964  3 Sheets-Sheet 1
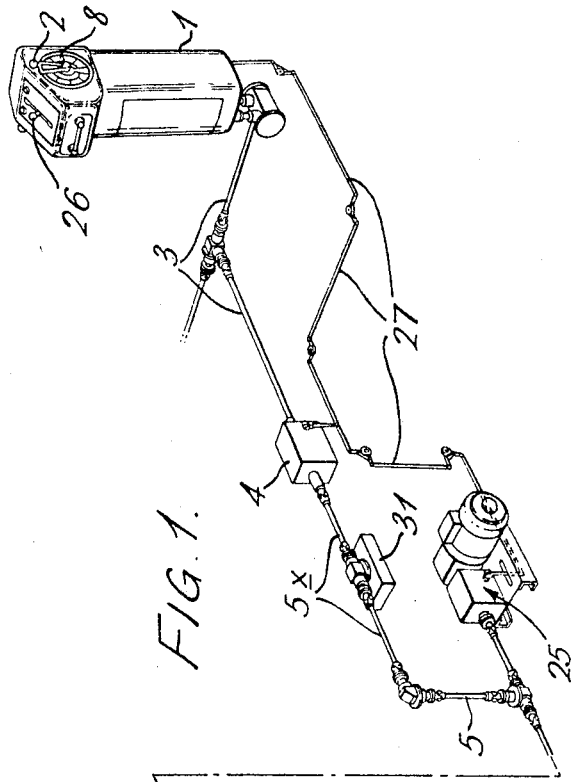
FIG. 1.
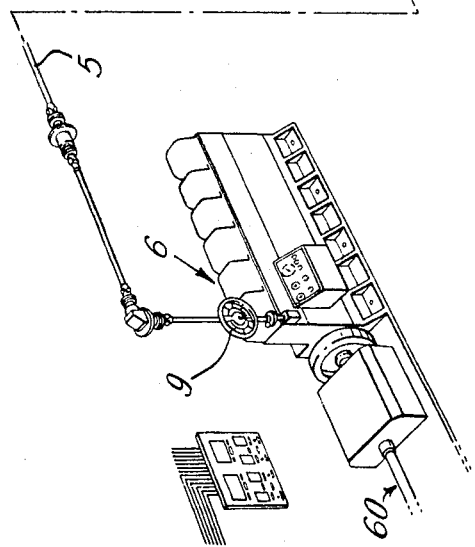
Inventor:
HERBERT JOHN GOODWIN
by
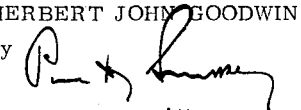
Attorney

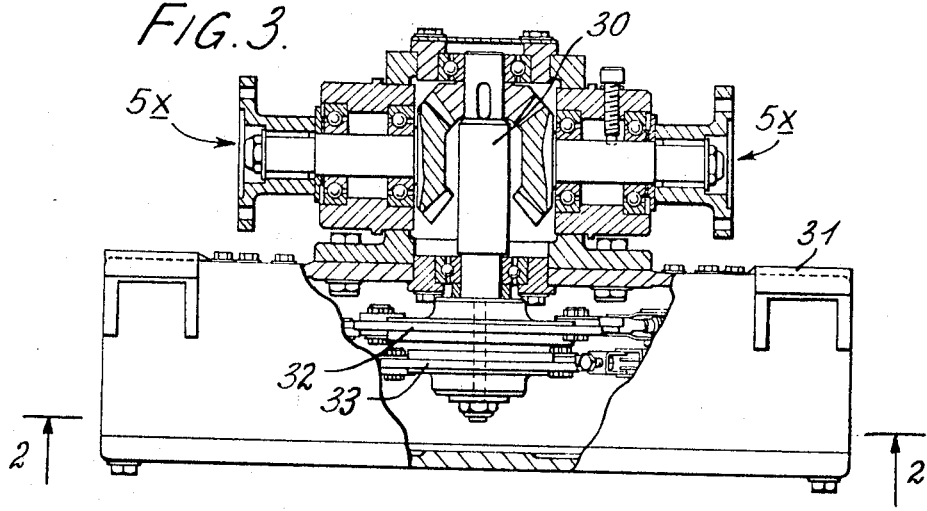
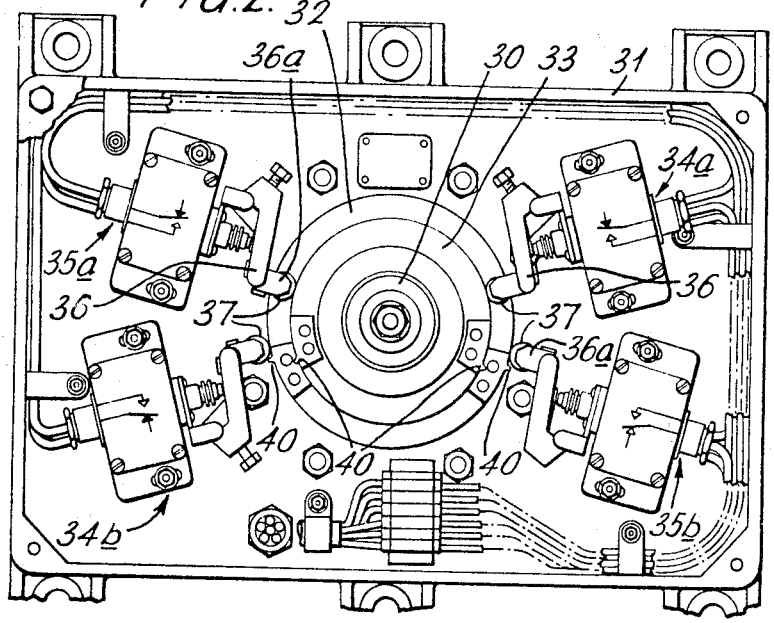

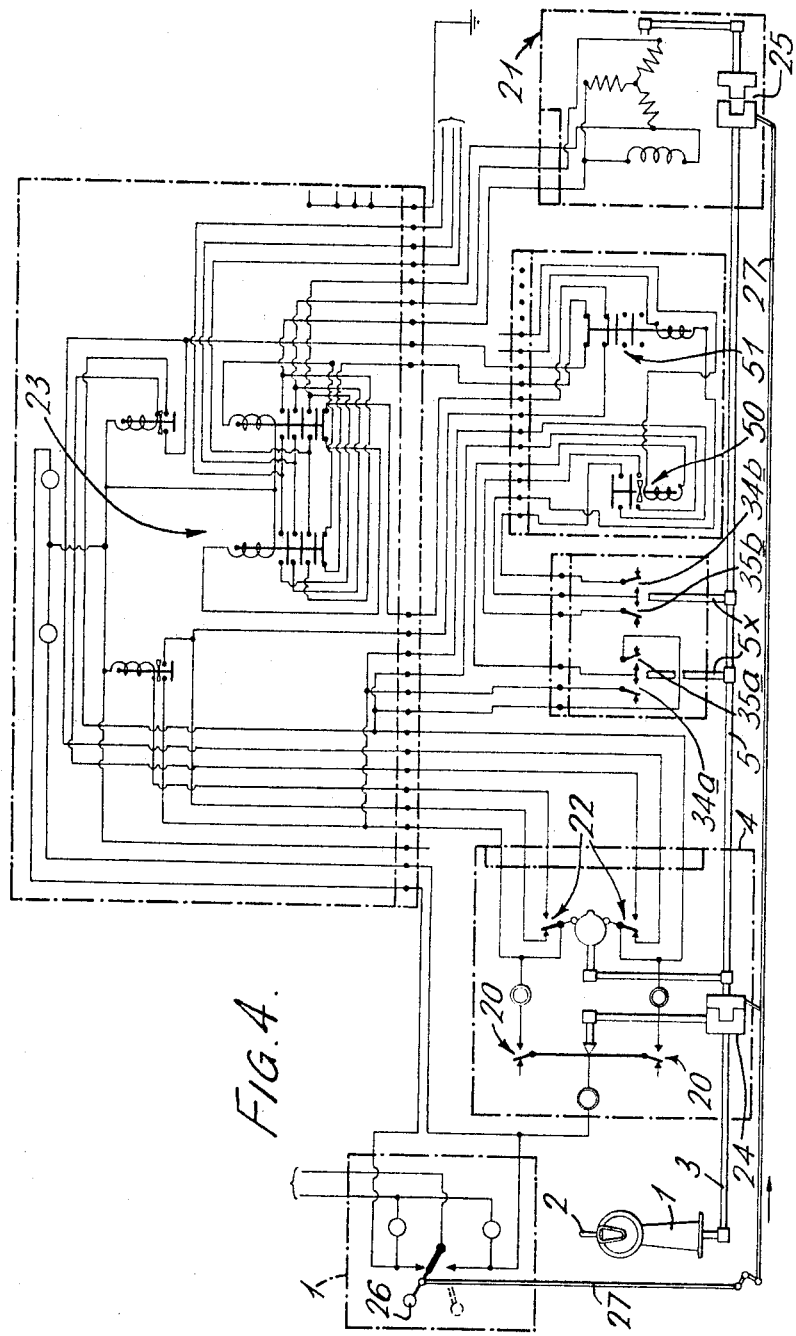

United States Patent Office 3,273,036
Patented Sept. 13, 1966

3,273,036
REMOTE CONTROL APPARATUS
Herbert John Goodwin, Ealing, London, England, assignor to Bloctube Controls Limited, Aylesbury, England, a British company
Filed Apr. 23, 1964, Ser. No. 362,021
Claims priority, application Great Britain, May 7, 1963, 18,039/63
3 Claims. (Cl. 318—31)

This invention concerns control apparatus of the kind in which a system of control rods or shafting is employed for transmitting movement to a prime mover and/or transmission gear or the like from a manually operable control handle disposed at a position remote from the prime mover, transmission gear or the like.

In the specification of my co-pending patent application No. 133,665, now U.S. Patent No. 3,210,627, I have described and claimed inter alia remote control apparatus comprising a manually operable control handle, and a system of control rods or shafting extending between such handle and the controls for a prime mover and/or transmission gear or the like, said system having therein near the control handle a selector unit which includes a control member, e.g. a control ring, operatively connected to the control handle so as always to move therewith, this member being adapted, on any movement thereof, to operate switch means thereby to energise an electric motor to transmit movement through reduction gear to the rods or shafting between the selector unit and the prime mover and/or transmission gear or the like, which rods or shafting are free to move independently of the control handle but are adapted to operate a follow-up member in the selector unit which is movable with respect to the control member therein so as to effect a second operation of said switch means to stop the electric motor after a movement of the controls for the prime mover and/or transmission gear corresponding to the initial movement of the control handle, has taken place.

The apparatus that I have particularly described in my said specification is especially adapted for use in a ship's telegraph and control system and the described apparatus is intended to be capable of transmitting movement from the control handle directly to the ship's engine and transmission controls.

With the remote control apparatus above described initial operation of the control handle in either direction selects electric switch means to be operated and through the chosen switch effects the energising of the electric motor which drives the shafting associated therewith through a reduction gear at a preselected r.p.m. until such time as the input signal and the electric motor and the driven follow-up member again synchronise.

It will thus be appreciated that the control handle may be positioned, for example, to "full ahead" and the electric motor for the adjustment of the prime mover and/or transmission gear or the like be caused to operate without interruption, thus permitting, for example, the engine speed to be increased before the appropriate clutches e.g. hydraulically actuated clutches, have been fully engaged with the possibility of consequential damage.

With the object of eliminating or reducing the possibility of such damage it has been proposed in the specification of my co-pending patent application No. 222,460, now U.S. Patent No. 3,210,628, to provide remote control apparatus comprising a manually operable control handle and a system of control rods or shafting extending between such handle and the controls for a prime mover and/or transmission gear or the like, such system having therein near the control handle a selector unit which includes a control member operatively connected to the control handle so as always to move therewith this control member being adapted on any movement thereof to operate switch means for energising an electric motor to transmit movement to the rods or shafting between the selector unit and the prime mover and/or transmission gear or the like, which rods or shafting are free to move independently of the control handle but are adapted to operate a follow-up member which is movable with respect to the said control member and adapted to operate said switch means to stop the electric motor after the latter has effected a movement of the controls for the prime mover and/or transmission gear or the like, corresponding to the initial movement of the control handle, has taken place; and means also driven from said electric motor and adapted to actuate time delay mechanism after a predetermined movement has been made by the said follow-up member to initiate the operation of the said controls for the prime mover and/or transmission gear or the like, actuation of said time delay mechanism interrupting for a predetermined period the operation of said electric motor and consequently affording the necessary time for the effective operation of said controls for the prime mover and/or transmission gear or the like.

The said time delay mechanism includes a cam incorporated in or rigidly associated with the said follow-up member or rigidly associated with a part rotating with such follow-up member.

Thus, in the case of a ship's telegraph system, the time delay mechanism may be arranged to provide a time delay appropriate to the time required for full disengagement and engagement of the respective "ahead" and "astern" clutches. Operation of the control handle will effect initial actuation of the electric motor and a movement of the controls for the prime mover and/or transmission gear or the like sufficient to initiate the operation of such controls whereafter the means for actuating the said time delay mechanism will cause a dwell of the electric motor for a pre-selected period such as to allow the completion of the engagement of clutches and the like whereafter the electric motor will be re-energised until the condition selected by the control handle has been reached i.e. where the said control member and the said follow-up member are again synchronised in the selector unit.

In a marine vessel today braking means are sometimes provided for the propellor shafting and the prime mover or engine of the vessel, such braking means being operable to reduce the speed of rotation of the propellor and its shafting and also the engine speed. To protect the prime mover from possible damage it is especially desirable that the propellor and its shafting should actually be brought to rest before drive thereto to effect a change in direction, that is from speed ahead to speed astern or vice versa, is transmitted.

The present invention has for its object to provide means for bringing this about, and while it has been developed in association with the inventions as described and claimed in our aforesaid co-pending patent applications it should be understood that it is not necessarily limited to a combination therewith.

According to this invention there is provided remote control apparatus comprising a manually operable control handle movable selectively from a neutral position to positions for drive in opposite senses, a system of control rods or shafting extending between such handle and the controls for a prime mover and/or transmission gear or the like driving further shafting to a propellor, an electric motor associated with said system and adapted to be energised, on movement of the handle to either of its drive positions, to transmit movement to members of the rods or shafting and so to the prime mover and/or transmission gear or the like and the propellor shafting, which members are free to move independently of but correspondingly to the movement of the control handle, and means also driven by the electric motor with the said members of the rods or shafting and adapted to actuate a time delay mechanism after the movement of the control handle from its position for drive in the one sense through its neutral position to its position for drive in the opposite sense, said time delay mechanism interrupting for a predetermined period the operation of the motor and consequently allowing time for the operation of braking means to bring the propellor shafting to rest and appropriately reduce the speed of the prime mover.

The means for actuating the time delay mechanism may comprise cam elements rotatable with a member of the rods or shafting and adapted to operate switch means de-energising the motor. According to a preferred feature of this invention the switch means includes switches arranged in pairs and operable in sequence, the first switch of each pair operating a time delay unit, of pneumatic, electric, hydraulic or other convenient form, and the second switch breaking the circuit to the electric motor, said time delay unit being adapted to close the second switch again after the predetermined period.

Thus the operation of the first switch will operate the time delay unit but will not stop the motor. Only if the second switch is also operated will the motor be stopped.

It is arranged that when the control handle is moved from one to the other of its drive positions, the first switch is operated when the handle nears its neutral position, and the second switch is operated as the control handle moves through the neutral position.

A separate pair of switches will be provided for movement of the control handle in each direction.

In the accompanying drawings:

FIGURE 1 illustrates a form of ship's telegraph control equipment incorporating the present invention, FIGURE 2 shows in plan and on an enlarged scale the switch control box included in the equipment as shown in FIGURE 1, FIGURE 3 is a side elevation, partly in section, of the switch control box as shown in FIGURE 2, and FIGURE 4 is a diagram illustrating the electric wiring as provided in the equipment shown in FIGURES 1, 2 and 3.

The ship's telegraph control equipment shown in FIGURE 1 of the drawings comprises a control pedestal 1 having a main control handle 2 and a system of input shafting 3 extending from the pedestal to a selector unit 4 and output shafting 5 extending from the selector unit to the ship's engine controls and transmission 6. The pedestal 1 includes an indicator dial 8 for indicating "stop" and speeds "ahead" and "astern," a similar indicator dial 9 being provided near the ship's engine.

The selector unit per se has been fully described in the specification to my co-pending patent application No. 222,460, now U.S. Patent No. 3,210,628, and so it is not proposed to describe it again in detail.

Briefly, however, it includes (see FIGURE 4) switch means 20 which are operated on any movement of the control handle 2 turning the input shafting 3, the operation of the switch means energising an electric servo motor 21 which drives the output shafting 5. The overall result is, of course, that the change of speed "ahead" or "astern" indicated by the movement of the control handle is transmitted to the ship's engine and transmission 6, the switch means being operated again to stop the motor when the output shafting 5 has been turned the required amount.

Also included in the selector unit 4 are further switch means 22 which are operated from the output shafting 5, after a predetermined movement thereof, to actuate time delay mechanisms 23 and so interrupt for a predetermined period of time the operation of the motor 21, the purpose of this being to afford time for the operation of controls for the ship's engine and transmission, for example the engagement of clutches as mentioned above.

A clutch 24 is provided for connecting the input and output shafting 3 and 5 at the selector unit for direct transmission of movement from the first to the second, and another clutch 25 is provided for disengaging the motor drive to the output shafting 5, the two clutches being operable together from a lever 26 in the control pedestal 1 through linkages 27, it being arranged that only one clutch can be engaged at a time. Direct manual control would be necessary if the motor or the power supply thereto should fail, the clutch 24 being engaged and the clutch 25 disengaged.

In the arrangement in accordance with the present invention (see especially FIGURES 2 and 3), one member 5x of the output shafting between the motor 21 and the selector unit 4 is adapted to rotate a shaft 30 journalled in a fixed box 31, and on the shaft 30 inside the box is a pair of coaxially disposed circular cam discs 32 and 33, the former being of larger diameter than the latter.

Two pairs of switches 34a, 34b and 35a, 35b are mounted in the box 31 around the cam discs 32 and 33, the switches in each pair being on diametrically opposite sides of the disc carrying shaft 30. Each switch comprises a trip arm 36 in the end of which is mounted a roller 37 engaging the circumferential periphery of one of the cam discs. Of each pair of switches the roller 37 of one switch (i.e. switch 34a or 35a) engages the cam disc 33 and the roller 37 of the other switch (i.e. switch 34b or 35b) engages the cam disc 32.

On the peripheries of the cam discs 32 and 33 bosses 40 are provided for co-operation with the trip arm rollers 36, the latter actually being carried in end pieces 36a which can pivot freely in one direction, against the force of suitable spring means (not shown) but not in the other. Thus when the cam discs are rotated either way only one pair of switches 34a, 34b or 35a, 35b will be operated.

The operation of the first switch in each pair (34a or 35a) energises a solenoid device 50 which brings into operation a time delay unit 51 (FIGURE 4) set for a predetermined period, that is a period which is adjustable to suit particular circumstances. The operation of the second switch breaks the circuit to the motor 21 which is thus stopped. After the predetermined period the time delay unit 51 operates to reclose the circuit to the motor.

If, for example, a ship employing the equipment as described above is proceeding at speed "ahead" and the control handle 2 is moved through neutral to speed "astern," the following will happen. Initially as the output shafting 5 is driven by the motor 21 in accordance with the change indicated, engine speed will naturally be reduced, and so the speed of rotation of the propellor shafting (indicated at 60 in FIGURE 1) will also fall. Before the shafting 5 reaches a position equivalent to the neutral position of the control handle 2 the switch 34a will be operated energising the time delay unit 51. As the shafting 5 continues to rotate through the equivalent of the neutral position of the control handle 2 the switch 34b will be operated stopping the motor 21. After a predetermined time interval the time delay mechanism 51 will operate again to restart the motor 21, such time interval having been sufficient to allow the engine speed to fall to "idling" and the propellor shafting to come to rest. In FIGURE 2 switch 34a has been operated and switch 34b is just about to be operated.

For movement of the control handle 2 from speed "astern" to speed "ahead" it will be the switches 35a and 35b that will be operated.

It will be appreciated that if a mere reduction in speed takes place without going from "ahead" to "astern" or vice versa the time delay unit 51 may be operated alone, but this does not stop the motor 21. Only if the output shafting 5 moves through the equivalent of the neutral position of the control handle will the motor 21 actually be stopped.

I claim:

1. Remote control apparatus comprising a manually operable control handle movable selectively from a neutral position to positions for drive in opposite senses, a first system control shafting extending between said handle and the controls for a prime mover and a transmission gear, said transmission gear driving a second system shafting to a propeller, an electric motor means having clutch means connected to said first system, said clutch means responsive to movement of said handle to either of its drive positions, to transmit movement to members of said control shafting and to said prime mover, transmission gear and said propeller shafting, said members being free to move independently of but correspondingly to the movement of said control handle, means driven by said electric motor means with said members of said control shafting for actuating a time delay mechanism after the movement of said control handle from its position for drive in the one sense through its neutral position to its position for drive in the opposite sense, said time delay mechanism comprising means to interrupt the operation of the motor means for a predetermined period of time, and braking means acting on said propeller shafting during said predetermined period for reducing the speed of said prime mover during said motor interruption.

2. Remote control apparatus as claimed in claim 1 wherein means for actuating the time delay mechanism comprises cam elements rotatable with a member of the shafting, said cam elements actuating the switch means to de-energize the motor.

3. Remote control apparatus as claimed in claim 2 wherein said switch means includes switches arranged in pairs and operable in sequence, the first switch of each pair operating a time delay unit, and the second switch breaking the circuit to the electric motor, said time delay unit being adapted to close the second switch again after the predetermined period.

References Cited by the Examiner
UNITED STATES PATENTS

| | | | |
|---|---|---|---|
| 3,020,457 | 2/1962 | Kelley | 318—31 |
| 3,210,628 | 10/1965 | Goodwin | 318—31 |

ORIS L. RADER, *Primary Examiner.*

G. FRIEDBERG, *Assistant Examiner.*